(12) United States Patent
Wagner

(10) Patent No.: US 7,908,904 B2
(45) Date of Patent: Mar. 22, 2011

(54) METHOD FOR DETECTING THE HERMETIC SEALING OF ENCLOSED AREAS

(75) Inventor: Ernst Werner Wagner, Winsen/Aller (DE)

(73) Assignee: Amrona AG (CH)

( * ) Notice: Subject to any disclaimer, the term of this patent is extended or adjusted under 35 U.S.C. 154(b) by 733 days.

(21) Appl. No.: 11/838,390

(22) Filed: Aug. 14, 2007

(65) Prior Publication Data

US 2008/0092633 A1 Apr. 24, 2008

(30) Foreign Application Priority Data

Oct. 19, 2006 (EP) ..................................... 06122596

(51) Int. Cl.
*G01M 3/00* (2006.01)
(52) U.S. Cl. ........................................................ 73/40.7
(58) Field of Classification Search ................... 73/40.7
See application file for complete search history.

(56) References Cited

U.S. PATENT DOCUMENTS

| | | | |
|---|---|---|---|
| 7,231,808 B2 * | 6/2007 | Wagner | 73/31.02 |
| 2005/0155407 A1 * | 7/2005 | Wagner | 73/23.2 |

FOREIGN PATENT DOCUMENTS

| | | |
|---|---|---|
| DE | 10251536 A1 | 5/2004 |
| FR | 2834066 A1 | 6/2003 |
| JP | 63214635 A | 9/1988 |

* cited by examiner

*Primary Examiner* — Daniel S Larkin
(74) *Attorney, Agent, or Firm* — Cesari and McKenna, LLP

(57) ABSTRACT

This method makes it possible, with highest possible precision and without any major expense, to determine the air tightness of an enclosed space. Specifically, it introduces a method which, on demand and in effective yet easy-to-implement fashion, permits at any time the updated determination of the existing air tightness of the enclosed space without requiring a complex test series. To that effect, the first step according to the method is to define a concentration gradient between the internal air atmosphere of an enclosed space and the ambient air atmosphere by setting the physical concentration of at least one constituent component of the space-internal air atmosphere, in particular of oxygen, at a value that differs from the physical concentration value of that minimum of one corresponding component in the ambient air atmosphere. This is followed by a determination of the concentration change rate in that, in the space-internal air atmosphere, the time-based change of the physical concentration of the minimum of one constituent component is measured. Finally, taking into account the previously determined concentration change rate, the air-tightness value of the enclosed space is calculated.

15 Claims, 2 Drawing Sheets

METHOD FOR DETECTING THE HERMETIC SEALING OF ENCLOSED AREAS

BACKGROUND

This invention relates to a method for determining the air-tightness of enclosed spaces. In particular, the invention relates to a method whereby, for permanently inertizable spaces inertized to prevent and/or extinguish a fire, the corresponding volume-based leakage rate can be determined with a maximum degree of accuracy.

The document FR 2 834 066 A1 describes a leakage detection method employing oxygen/gas sensors. The prior-art measuring principle is based on the fact that the partial gas pressure component on the detector element is modified by the inward or outward seepage of an inert or reactive test gas.

The document DE 102 51 536 A1 describes a method for minimizing gas consumption in gas-filling operations and for leak detection in such gas-filling processes. That prior-art method employs a test gas serving to eliminate the need for replenishment.

The document JP 63 214635 A describes yet another leak detection method whereby a test gas is introduced in the atmosphere of an enclosed container. The object to be tested (for its gas tightness) is placed in a container with a gas detector built into said object. It can then be determined whether the test gas penetrates into the object by permeating the walls of the object.

Inertization procedures for lessening the risk of a fire in an enclosed space have been known from fire fighting technology. These inertization procedures typically involve the injection of an oxygen-displacing gas from an inert-gas source so as to lower the air atmosphere in the enclosed space to, and maintain it at, an inert level below the oxygen concentration in the ambient air atmosphere. The preventive and extinctive effect of that process is based on the principle of oxygen depletion. Normal ambient air is known to consist of about 21% by volume oxygen, 78% by volume nitrogen and 1% by volume other gases. To reduce the risk of a fire breaking out and/or to extinguish a fire that has already broken out in an enclosed space, the introduction for instance of pure nitrogen as the inert gas further increases the nitrogen concentration in the enclosed space concerned and reduces the proportional oxygen content. An extinctive effect is known to set in when the oxygen component drops off to below about 15% by volume. Depending on whatever flammable materials are present in the enclosed space, the oxygen component may have to be further reduced to perhaps 12% by volume. Most flammable materials cannot burn at that oxygen level.

When in an ancillary inert-gas fire extinguishing system employing the inert-gas fire fighting technology referred to above the highest possible safety standard is to be met, it will be necessary to provide for facility- and logistics-related planning in the event of an operational shut-down due to functional failures, in order to comply with the established safety requirements. Yet even if in designing the inert-gas fire fighting system all measures are taken into account that permit the quickest and smoothest possible resumption of the operation, the inertization of enclosed spaces nevertheless entails certain problems and is clearly limited in terms of fail-safe operation. It has been found that, while it is possible to design a fire extinguishing system in a way as to make a failure during the lowering or adjustment of the oxygen content in the enclosed space to an inert level relatively unlikely, it is often difficult to maintain that lowered, inert state at the required level for an extended period, especially for the duration of the so-called "emergency operation phase". This is due primarily to the fact that prior-art inertization methods do not offer the possibility of preventing the flashback threshold of the oxygen concentration in the enclosed space from being prematurely exceeded when a disruption causes all or at least part of the inert-gas feed to fail.

The above-mentioned flashback stage is defined by the time segment following the so-called "fire fighting phase" during which the oxygen concentration in the enclosed space must not exceed a specific value, the so-called "flashback prevention threshold", to avoid reignition of the materials present in the protected area. The flashback prevention threshold is an oxygen concentration that depends on the fire load of the enclosed space and is determined by experimentation. According to industrial safety regulations, the oxygen concentration in the enclosed space, when flooded, must be such that the flashback prevention threshold of for instance 13.8% by volume is not reached within the first 60 seconds after the flooding began. These 60 seconds after the start of the flooding are also known as the "fire fighting phase".

Nor must the flashback prevention threshold be exceeded within 10 minutes after the end of the fire fighting phase. This is based on the premise that within the fire fighting phase the fire in the protected area is fully extinguished. The time segment (for instance 10 minutes) following the fire fighting phase, intended to make certain that the fire extinguished-during the fire fighting phase will not flare up again, is referred to as the "flashback stage".

In applying prior-art inertization methods it is customary, immediately upon detection of a fire in the enclosed space, to reduce the oxygen concentration in the atmosphere of the enclosed space as quickly as possible to a so-called "operating concentration". The inert gas required to that effect is usually supplied by an appropriate inert-gas source that is part of the inert-gas fire extinguishing system. The term "operating concentration" or "operating concentration level" refers to an inert state below a so-called "configurational concentration" for the specific enclosed space concerned.

The "configurational concentration" of the enclosed space concerned is an oxygen concentration in the atmosphere of the enclosed space at which the ignition of any material present in the enclosed space is effectively prevented. In other words, the "configurational concentration level" in the enclosed space concerned represents the inertization level at which the ignition of any materials present in the enclosed space is effectively prevented. When setting the configurational concentration, i.e. the configurational concentration level for an enclosed space, a further safety margin is usually added below the threshold, i.e. deducted from the "concentration threshold value" at which no ignition of any material in the enclosed space can take place.

Once the operating concentration has been reached in the internal air atmosphere of the enclosed space, the oxygen concentration is usually maintained, by means of a control concentration setting below the operating concentration of the enclosed space, at a so-called "control concentration level". This control concentration is a control range of the residual oxygen concentration in the inertized internal air atmosphere of the enclosed space within which the oxygen concentration is maintained during the flashback stage. That control range is usually delineated by an upper limit that defines the threshold for activating the inert-gas source, and a lower limit that defines the threshold for deactivating the inert-gas source of the inert-gas fire extinguishing system. During the flashback stage the control concentration is usually maintained within that control range by the repeated injection of inert gas. As stated above, the necessary inert gas is usually supplied by the inert-gas source of the inert-gas fire extinguishing system in the form of a reservoir, i.e. a device serving to generate an oxygen-displacing gas (such as a nitrogen generator), or from gas bottles or some other buffer supply unit.

However, a danger in the event of a malfunction or disruption of the inert-gas fire extinguishing system consists in the possibility of a premature increase of the oxygen concentration in the internal air atmosphere of the enclosed space, thus exceeding the flashback prevention threshold before expiration of the above-mentioned 10 minutes after the end of the fire fighting phase, i.e. before the end of the flashback stage. That would shorten the flashback stage and under certain circumstances it may no longer be possible to ensure a successful suppression of the fire in the enclosed space.

Addressing the above-described problem with regard to the industrial safety requirements for an inert-gas fire extinguishing system, i.e. for an inertization method, EP 1 550 481 A1 introduces an inertization method whereby the oxygen content in the internal air atmosphere in the enclosed space is reduced to a control concentration at a level below the operating concentration in that space, with both the control concentration and the operating concentration, along with a fail-safe margin, reduced far enough below the configurational concentration established for the enclosed space to cause the upslope of the oxygen content in the internal air atmosphere of the enclosed space, in the event of a malfunction of the inert-gas source, to reach a concentration threshold value determined for the enclosed space only after a predefined time interval. In particular, that concentration threshold value is the flashback prevention threshold for the enclosed space.

The flashback prevention threshold corresponds to an oxygen concentration in the internal air atmosphere of the enclosed space at which flammable materials in the enclosed space are certain not to be ignitable anymore. Expressed in other words, the prior-art solution referred to provides for the operating concentration to be set so low from the start that the upslope of the oxygen concentration will not reach the concentration threshold value until after a particular time, that time being long enough to initiate a flashback stage during which the oxygen content does not exceed the flashback prevention threshold, thus effectively preventing an ignition or reignition of flammable materials in the enclosed space.

This so-called "ramp-down" of the operating concentration, i.e. setting the operating concentration along with an additional fail-safe margin below the configurational concentration level of the enclosed space, makes it possible in the event of a breakdown of the inert-gas source to maintain the oxygen concentration below the flashback prevention threshold at least for the duration of an emergency operation.

The size of the additional fail-safe margin, i.e. the question of the extent to which the operating concentration must be set below the configurational concentration of the enclosed space, depends most of all on the air exchange rate to which the enclosed space is exposed. In inert-gas fire fighting technology, n50 is the value serving as the primary measure for determining the air tightness of an enclosed space.

The n50 air exchange rate is a function of the air flow volume per hour when a differential pressure of 50 Pa is maintained, divided by the volume of the structure. Accordingly, the lower the air exchange rate, the higher the air-tightness rating.

The n50 value as an indicator of the air tightness of an enclosed space is usually measured by a differential-pressure (Blower-Door) method. In the case especially of larger buildings or rooms, however, conducting a differential pressure test series for determining the n50 air exchange rate is often possible only under certain difficult conditions since establishing a pressure difference of 50 Pa between the internal air atmosphere in the enclosed space and the ambient air atmosphere outside the enclosed space is often found to be unattainable. Moreover, when a differential-pressure measurement is conducted, one cannot rule out the possibility of a change in the atmospheric condition within the enclosed space during the course of the test especially in terms of the air exchange rate. For example, the positive and negative pressures necessarily applied in the enclosed space during the differential-pressure measuring process may conceivably cause originally sealed openings to leak. Even the contents of the enclosed space, such as objects or merchandise (especially in the case of a storage facility) will affect the n50 air exchange rate determined by the differential-pressure measurement.

Since the air exchange rate of the enclosed space can only be measured with a certain degree of unreliability, if at all, it is necessary in the above-mentioned inertization process to make the additional fail-safe margin sufficiently large in order to meet the industrial safety requirements. Yet providing such a large safety margin has an unfavorable impact on the routine operating cost of the inert-gas fire extinguishing system concerned since it always involves the injection of substantially more inert gas into the enclosed space than would actually be necessary.

SUMMARY

In view of the problematic situation described it is the objective of this present invention to introduce a method which allows the air tightness of an enclosed space to be measured with the highest possible degree of accuracy and without major expense, where the enclosed space concerned lends itself particularly well to the application of the inert-gas fire fighting techniques described above. Specifically, a method is introduced which, in effective yet easily implementable fashion, allows the current air tightness of the enclosed space to be determined whenever necessary and at any time without necessitating a complex test series such as is the case in the prior-art differential-pressure measuring approach.

To achieve this stated objective, the invention introduces a method for determining the air tightness of enclosed spaces whereby, as a first step, a concentration drop between the internal air atmosphere of the enclosed space and the ambient air atmosphere is established in that the concentration of at least one constituent component of the internal air atmosphere within the enclosed space, especially that of oxygen, is set at a value that differs from the concentration of the counterpart of the said minimum of one constituent component in the ambient air. This is followed in the procedure according to the invention by determining a change in concentrations, for which purpose the time-related change of the said minimum of one component in the internal atmosphere within the enclosed space is registered, for instance by repeatedly measuring the concentration of the said minimum of one component of the space-internal air atmosphere. Finally, according to the invention, an air tightness value of the enclosed space is calculated on the basis of the concentration change rate.

The solution according to the invention offers a number of significant advantages over conventional prior-art techniques. Specifically, the method according to the invention is capable of determining for the enclosed space the associated volume-related leakage rate at atmospheric pressure. It follows that with this method it is possible to measure the rate of air infiltration into the enclosed space, which, by its very definition, the differential-pressure approach cannot do; the differential-pressure concept merely permits the determination of a volume-related leakage rate based on a reference pressure difference and the result of that measurement is used for calculating the estimated air infiltration.

The chief advantage of the solution according to the invention, however, lies in the fact that, without any major structural or financial investment, the method for determining the air tightness of enclosed spaces can be integrated into a conventional, prior-art inertization process for fire prevention and fire fighting as described above. The main reason for this is that an inertization process always requires the setting of an inert level in the enclosed space at which the value of the oxygen content of the space-internal atmosphere is lower compared to the oxygen content of the ambient atmosphere. Thus, as a particular inert level is selected for the internal air atmosphere in the enclosed space, it already includes the setting of a concentration gradient between the space-internal air atmosphere and the ambient air atmosphere. Since in inert-gas fire fighting technology the inert-gas concentration in the enclosed space is usually measured on a continuous or scheduled or event-related basis for determining whether the inert level in the internal atmosphere is at the setpoint value, the inert-gas fire extinguishing system already includes the technical provisions employable for measuring concentration changes in the internal air atmosphere of the enclosed space. It follows that the solution according to this invention is a particularly easy-to-implement concept for determining the air tightness of enclosed spaces.

As another advantage directly related to what has been said above, the method according to the invention lends itself particularly well to the determination of the air tightness of the enclosed space whenever needed and especially at short intervals. Accordingly, as an example, it is possible to check the air tightness of the enclosed space either at scheduled times (perhaps each day, every hour, etc.) or upon predefined events (such as the setting of a particular inert state of the internal air atmosphere of the enclosed space), thus permitting at all times the continuous monitoring of the existing air tightness of the enclosed space. In particular, it also permits the detection, and corresponding treatment, for instance of aging-induced leaks in the building or room enclosure. The method can also serve to detect changes in the air tightness of the enclosed space that may have been caused for instance by windy conditions.

The invention makes it possible in advantageous fashion to calculate the degree of air tightness based on changes in the oxygen concentration within the space-internal air atmosphere. Of course, it is equally possible to determine that degree of air tightness as a function of the rate at which the inert gas present in the space-internal atmosphere is subject to concentration changes. Accordingly, the method according to the invention can be applied for permeability measurements of continuously inertized rooms, in which case the tightness of the enclosed space is determined on the basis of the inert gas in the enclosed space, i.e. the volume-specific measurement is targeted at the structure-related escape rate of the inert gas from the enclosed space. That inert-gas volume leakage rate also includes the leakage flow from the enclosed space caused by inert-gas diffusion.

Advantageously enhanced versions of the method according to the invention are specified in the sub-claims.

Accordingly, one advantageous implementation of the method according to the invention provides for the detection of the rate of concentration changes in that the concentration change rate is measured during a time span in which no controlled air exchange takes place in the enclosed space. For the purpose of this description, the term "controlled air exchange" generally refers to an air exchange between the space-internal air and the ambient air which is accomplished in regulated, controlled fashion for instance by means of mechanical ventilation systems, the opening of doors or gates, etc. It is especially in permanently inertizable enclosed spaces where, in keeping with modern building codes, the room or building enclosure is nearly air-tight, that an uncontrolled air exchange is no longer possible, thus requiring a controlled air exchange by means of corresponding ventilation systems.

As contrasted to the controlled air exchange, the definition of an "uncontrolled air exchange" is an air exchange that takes place in unregulated fashion in that the room or building enclosure is intentionally or unintentionally left with certain leakage points and is therefore not air-tight. The effect of the uncontrolled air exchange on the space-internal air exchange rate substantially depends on weather and wind conditions and can be measured with the aid of the method according to the invention.

In applying the last-mentioned, preferred implementation of the method according to the invention, whereby the concentration change rate in the internal air atmosphere within the enclosed space is measured during a time span in which no controlled air exchange takes place, it may also be desirable to conduct the procedural step of determining the concentration change rate concerned after the gradient for a specific concentration difference has been defined. This would be the case for instance after the enclosed space, whose air tightness is to be determined, has been at least partly flooded for the setting of a specific inert level by the injection of an inert gas from the inert-gas source of an inert-gas fire extinguishing system. Concurrently with the setting of a particular inertization level in the internal air atmosphere of the enclosed space, the concentration gradient between the space-internal air atmosphere and the ambient air atmosphere is defined as well. For a determination of the concentration change rate, all that is necessary with the preferred, enhanced version of the method is to periodically stop the flow of any additional inert gas into the internal air atmosphere of the enclosed space so as to inhibit any controlled air exchange.

However, as an alternative to the last-mentioned mode of implementation of the method according to the invention, it is also possible in the course of the air-tightness measurement of the enclosed space to determine the concentration change rate during a time span in which a controlled air exchange takes place at a known air exchange rate. Accordingly, the concentration change rate can be determined simultaneously with the setting of the concentration gradient between the space-internal air atmosphere and the ambient air atmosphere, as long as the air exchange rate into the internal air atmosphere of the enclosed space is known at the time of the selection of the concentration gradient.

Then again, it would also be possible to determine the concentration change rate while for instance a mechanical ventilation system installed in the enclosed space produces a controlled air exchange. In a broader sense this means that a concentration change rate can be determined even when for instance a door to the enclosed space, serving in its closed state to isolate the space-internal air atmosphere from the ambient air atmosphere, is opened and thus permits a controlled air exchange. That, of course, is contingent on a known value of the controlled air exchange rate.

It is particularly desirable in the case of a controlled air exchange to know not only the air exchange rate but also the proportion of that minimum of one component in the air entering the enclosed space through the controlled air exchange. Of course, it is possible to estimate the air exchange rate of the controlled air exchange and/or the chemical composition of the air entering in the process of the air exchange.

With regard to the determination of the concentration change rate, such determination is preferably made by measuring a time period within which, due to leaks in the room enclosure, the oxygen content in the space-internal air atmosphere rises progressively from a first predefinable oxygen concentration to a second predefinable oxygen concentration. In a preferred implementation, the time measurement is performed in tandem with a measurement of the oxygen concentration in the enclosed space. This can be accomplished for instance by means of an aspirating oxygen measuring device.

With regard to the setting of the concentration gradient between the space-internal air atmosphere and the ambient air atmosphere, another preferred implementation of the method according to the invention provides for this setting to be defined by adding air to the space-internal atmosphere in controlled fashion, with the concentration of that minimum of one component being different in the added air from the corresponding value of the concentration of that minimum of one component in the ambient atmosphere. In addition it would be possible to select for the concentration of that minimum of one component in the added air a predefinable setpoint value while for determining the air tightness of the enclosed space the concentration change rate is measured during the infusion of the added air into the space-internal air atmosphere. Generally, of course, other forms of implementation are possible as well.

In order to be able to determine with the method according to the invention not only the air tightness of the enclosed space but also the current air volume within that space, a particularly preferred implementation of the novel method begins with the measurement of the proportion of at least one component, in particular oxygen, in the internal air atmosphere of the enclosed space. This can be accomplished for instance by means of an oxygen sensor installed within the space-internal air atmosphere, or with an aspirating system designed to measure the proportionality of a particular component of the space-internal atmosphere. According to the invention, the determination of the proportion for instance of oxygen in the space-internal atmosphere is followed by the controlled injection of added air, with the concentration of that minimum of one component in the added air, in particular of the oxygen in the added air, differing from the concentration of that minimum of one component (oxygen) contained in the space-internal atmosphere, and with the volume flow rate of the added air that is injected into the enclosed space as well as the concentration of that minimum of one component in the added air (oxygen) being known factors. This in turn is followed by another measurement of the proportion of that minimum of one component in the internal atmosphere of the enclosed space. The proportion of that specific component of the space-internal atmosphere prior to the injection of added air into the enclosed space, the proportion of that specific component in the space-internal atmosphere after the injection of added air, the volume flow rate of the added air injected into the enclosed space and the concentration of that specific component in the added air injected into the enclosed space are then used for calculating the air volume in the enclosed space at the time of the measurement.

Since it is not only the air tightness but also the internal air atmosphere of the enclosed space that constitute key parameters especially with a view to as precise as possible a composition of the inertization process and especially to as precise as possible a dimensioning of the inert gases to be made available and injected, the last-mentioned, preferred form of implementation of the method according to the invention advantageously permits, at any time, an extremely precise quantification of the essential parameters for the configuration of the inert-gas fire extinguishing system with regard to the enclosed space that is to be protected by that inert-gas fire extinguishing system.

Another advantage of the last-mentioned form of implementation of the method according to the invention, which is additionally capable of determining the internal air volume of the enclosed space, is offered by the fact that the procedural step of injecting added air into the space-internal atmosphere can coincide with the procedural step of defining a concentration gradient between the space-internal air atmosphere and the ambient air atmosphere. It is self-evident that the injection of added air into the space-internal air atmosphere can on its part coincide with the selection of an inertization level in the internal atmosphere of the enclosed space. That makes it a procedure which can be integrated into an existing inertization process without much of an effort.

Finally, with regard to the calculation of the air-tightness value, taking into account the concentration change rate, it is possible in advantageous fashion to arrive at an absolute value for air tightness by calculating on the basis of the concentration change rate and the space-internal air volume a volume-flow-related leakage rate and converting that into an absolute air-tightness value, meaning an air-tightness value referenced against a zero value representing a 100% hermetic condition. However, converting the calculated volume-flow-related leakage rate into an absolute air-tightness value is not necessarily required since the volume-flow-related leakage rate already represents an absolute air tightness value. The space-internal air volume used in calculating the absolute air-tightness value can first be measured by applying the above-described preferred form of implementation of the method according to the invention; in the calculation it is also possible, of course, to assume that space-internal air volume to be a constant value.

As an alternative to the above-described calculation of the absolute air-tightness value it is equally possible to calculate a relative air-tightness value for the enclosed space after allowing for the concentration change rate, in that the concentration change rate is compared against predefined values that are stored for instance in a corresponding look-up table, with the result of that comparison reflecting the time-based increase and/or decrease of the air tightness of the enclosed space. The relative air tightness value is referenced against an air tightness value other than the zero value, for instance an air tightness value that was established by a prior measurement of the enclosed space concerned, or a predefined air-tightness setpoint value.

As mentioned above, the method according to the invention lends itself particularly well as an addition to an inertization process in which the air-tightness value calculated by the novel method is a directly influencing factor in that inertization process especially with regard to the amount of the fire-extinguishing inert gas. Specifically, it would be possible at the time the air tightness of the enclosed space is measured to set the concentration gradient between the space-internal air atmosphere and the ambient air atmosphere in that the oxygen content in the enclosed space is reduced to a first predefinable inertization level by the injection of an oxygen-displacing gas. The first predefinable inertization level may be an operating concentration level or a control concentration level. Of course, that first predefinable inertization level may equally well be the configurational concentration level or the concentration threshold value.

As another advantageous feature in the application of the method according to the invention, the calculation of the air-tightness value for the enclosed space is followed by adjusting and maintaining the oxygen content in the internal atmosphere of the enclosed space, via a predefinable control range, at a control concentration that is below the operating concentration of the enclosed space, in that an oxygen-displacing gas is fed from an inert-gas source into the enclosed space, whereby the control concentration and the operating concentration, including an added fail-safe margin, are reduced to a point well below the configurational concentration specified for the protective range so that in the event of a failure of the primary source the upslope of the oxygen content will not reach the concentration level determined for the protective range until after a preset point in time, for which purpose the fail-safe margin is selected in adaptation to the predetermined air-tightness value that applies to the enclosed space. It is thus possible to obtain optimal precision in adapting an inertization process to the enclosed space by an appropriate measurement of the air-tightness value of the enclosed space. Significantly, the air-tightness value of the enclosed space, used for dimensioning the fail-safe margin, can be updated continuously or at scheduled times or upon particular events, as a result of which the inertization process is configured around a nearly error-free air-tightness value.

In a preferred enhancement of the form of implementation last mentioned, it is possible in the space-internal atmosphere, by means of an appropriate detector, to additionally quantify fires in a manner whereby upon the detection of a developing or existing fire the oxygen content in the enclosed space rapidly drops down from any previously higher level to the control concentration. This enhancement of the novel method for the possible inertization of the enclosed space now permits that method to be implemented for instance in a multi-stage inertization process as well. Conceivably, for example, the enclosed space is initially held at a correspondingly higher inertization level for instance to allow persons to enter the room. That higher inertization level may be either the concentration of the ambient atmosphere (oxygen at 21% by volume) or a first, or basic, inertization level with an oxygen content for instance of 17% by volume. It is further possible to initially reduce the oxygen content in the enclosed space to a particular basic inertization level, for instance at 17% by volume, and in the event of a fire to reduce the oxygen content further to a specific fully inert level at the control concentration. A basic inert level with an oxygen concentration of 17% by volume does not pose any danger to humans or animals, meaning that the room can still be entered without a problem. Setting the system at the fully inert level, i.e. at control concentration, can take place upon the detection of an incipient fire but, conceivably, it could also be set at that level for instance at night when no one enters the room concerned. At the control concentration the flammability of all materials in the enclosed space is reduced to a point where an ignition is no longer possible.

A targeted ramp-down of the oxygen concentration advantageously and significantly improves the fail-safe characteristics of the inertization process since it makes certain that even if the inert-gas source fails, adequate fire protection remains intact; an "overdimensioning" of the fail-safe margin is no longer necessary, which is an advantage from the economic point of view.

In a particularly preferred version of the form of implementation last described, employing the method according to the invention in an inert-gas fire extinguishing system, the magnitude of the oxygen content in the control range is about 0.4% by volume. Moreover, the control range should be below the control concentration.

Finally, in order to adapt the size or capacity of the inert-gas source required for the inertization process as precisely to the enclosed space as possible, the method permits the calculation of the extinguishing agent needed to maintain the control concentration in the enclosed space, taking into account the established air-tightness value of the enclosed space.

Since the air tightness of the enclosed space can vary with time and depends in particular on ambient atmospheric parameters such as wind speed or temperatures, a preferred enhancement of the solution according to the invention provides for the method to include the procedural step of regulating the inert-gas source as a function of the last calculated quantity of the extinguishing agent. For example, on days with strong winds it will be necessary to feed a maximum amount of inert gas to the enclosed space in order to maintain the control concentration in the room. In any such case, according to the preferred enhanced form of implementation of the method, an appropriate regulating command goes to the inert-gas source. If the inert-gas source employed is an inert-gas generator, the compressor of the inert-gas generator is regulated in such fashion that on very windy days it generates maximum pressure. Conversely, the inert-gas feed rate needed to maintain the control concentration for instance on calm days, i.e. when by comparison with windy days the air tightness of the enclosed space is higher, is less than the maximum inert-gas feed rate. Accordingly, the compressor of the inert-gas generator can be so regulated on calm days as to operate in a derated mode, delivering at its output a lower-than-maximum pressure. Since the amount of inert gas to be supplied by the inert-gas source is regulated as a function of the currently calculated required quantity of the extinguishing agent and thus of the current air tightness, the inert-gas source only needs to supply the amount of inert gas per time unit as is actually needed for maintaining the control concentration. If the inert-gas source is a nitrogen gas generator with a compressor and an in-line diaphragm, it is thus possible to regulate the pressure generated by the compressor at the intake of the diaphragm system in adaptation to the currently existing air tightness, so that the inert-gas source will always supply only the amount of inert gas that is needed for maintaining the control concentration, thus operating in an altogether economic fashion.

DESCRIPTION OF THE DRAWINGS

The following will describe the method according to this invention in more detail with the aid of the attached diagrams in which:

FIG. 1b shows a time-based segment of the inert-gas flooding pattern depicted in FIG. 1a.

ILLUSTRATIVE EMBODIMENTS

Figure 1A:
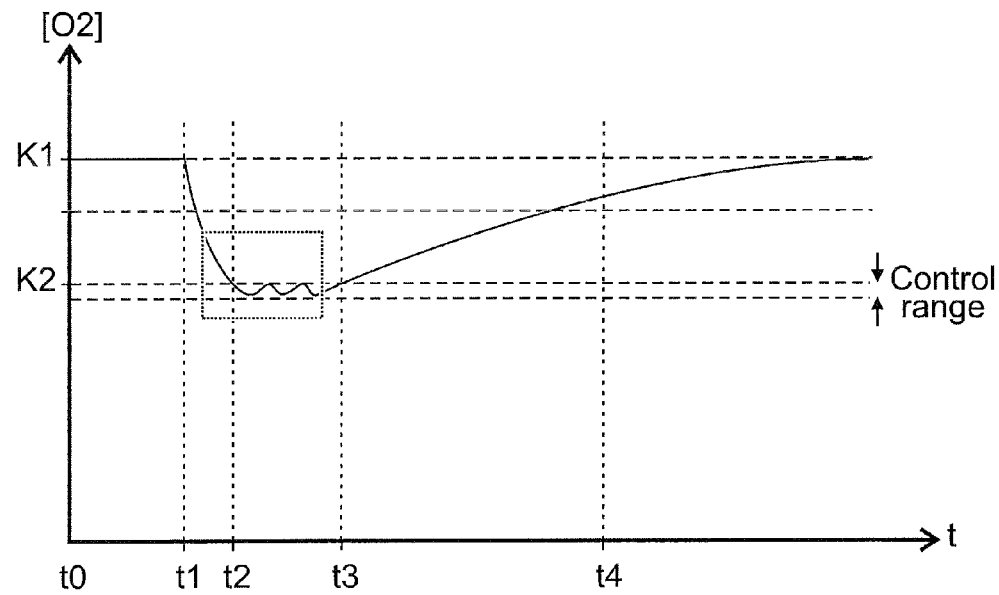
FIG. 1a shows an inert-gas flooding pattern in an enclosed space, employing a first preferred form of implementation of the method according to the invention.

FIG. 1a is a schematic illustration of the inert-gas flooding pattern in an enclosed space, employing a first preferred form of implementation of the method according to the invention for determining the air tightness of that enclosed space. The X-axis represents the time t while the Y-axis indicates the concentration of a component (desirably the oxygen concentration) in the space-internal air atmosphere. In the preferred forms of implementation described below, that particular component of the enclosed-space atmosphere is the oxygen content. The invention, however, is not limited to this particular gas; instead, that component in the space-internal atmosphere may conceivably be the inert-gas (nitrogen) constituent, or for instance a noble-gas constituent of the enclosed-space atmosphere.

The flooding pattern shown in FIG. 1a merely shows the characteristic time-based events within the progression of that pattern. It must be stressed at this juncture that the time axis in particular is not entirely to scale. For example, the time period $\Delta T_{leakage}$ within which the oxygen concentration in the space-internal atmosphere rises continuously due to leaks in the room enclosure is usually substantially shorter than the time period $\Delta T_{infeed}$ within which the oxygen proportion of the enclosed-space atmosphere is reduced again by the infusion of inert gas (such as nitrogen-enriched air).

As illustrated, the oxygen concentration in the enclosed-space atmosphere from time t0 to time t1 is established at a first constant value K1. That first concentration value K1 could conceivably represent an oxygen concentration of 21% by volume, which would be identical to the oxygen concentration in the ambient air atmosphere. On the other hand, that concentration value K1 could equally well represent an inertization level, already established in the enclosed space, of less than 21% by volume of oxygen.

In order to be able to determine the air-tightness value of the enclosed space, employing the first form of implementation of the method according to the invention, the oxygen concentration in the enclosed-space atmosphere is lowered, during the time period from t1 to t2, from the initial concentration value K1 to a second concentration value K2 which is less than the concentration value K1. The reduction of the oxygen concentration in the enclosed space is accomplished for instance by injecting an inert gas (such as $N_2$, argon or $CO_2$) into the enclosed-space atmosphere. Injecting the inert gas into the enclosed-space air atmosphere and reducing the oxygen concentration to the K2 inertization level in a situation where for instance the inert-gas fire extinguishing technique is applied and as a preventive measure the oxygen content in the enclosed space is lowered so as to reduce the risk of a fire developing in that room, can take place for instance at a time when the room need no longer be entered by anyone. Concurrently with the lowering of the oxygen concentration, a concentration gradient is defined between the enclosed-space air atmosphere and the ambient air atmosphere where, in the example shown in FIG. 1a, the oxygen concentration is at the K1 value.

During the time period between t2 and t3, the inert K2 level in the space-internal air atmosphere is maintained at the K2 value by the controlled injection of inert gas and/or ambient (outside) air, perhaps with a control range if one is provided.

At time t3, any controlled air exchange in the space-internal air atmosphere is stopped, meaning that no further inert gas or added air is introduced in the enclosed space in controlled fashion. Due to the leaks in the enclosed space there will always be some uncontrolled air exchange. The extent of that uncontrolled air exchange is determined with the aid of the method according to the invention. As a consequence of the uncontrolled air exchange, at least part of the space-internal air which at time t3 has an oxygen concentration of K2, will be subject to an uncontrolled air exchange with the ambient atmosphere whose oxygen content is K1.

In the flooding pattern shown in FIG. 1a, this uncontrolled air exchange is reflected by the fact that from time t3 on the oxygen concentration in the enclosed-room atmosphere rises continuously.

Since according to the invention the time-based change of the oxygen concentration value in the space-internal air atmosphere can be detected for instance with the aid of an appropriate oxygen sensor, it is possible to derive quantitative information on the uncontrolled air exchange taking place in the enclosed space and thus on the air tightness of the enclosed space. In the example shown in FIG. 1a, the concentration change rate is determined during the time period between t3 and t4. In desirable fashion, multiple oxygen concentration values are recorded during that time period, allowing highly precise quantification of the slope of the oxygen concentration increase in the measuring window between time t3 and time t4. The slope of the oxygen concentration progression, i.e. the oxygen concentration pattern extrapolated as a function of time reflects the concentration change rate being determined in the space-internal atmosphere.

Following the determination of the concentration change rate the oxygen concentration value continues to increase continuously, as illustrated in FIG. 1a, until it has once again reached the K1 concentration value which is identical to the oxygen concentration value in the ambient air atmosphere. Of course, after the determination of the concentration change rate at time t4 is completed, the oxygen concentration in the space-internal atmosphere could be reset to the K2 inertization level (or some other preselectable level), which would be necessary for instance when for fire prevention purposes the enclosed space is to be permanently inertized.

The method, described with reference to the inert-gas flooding pattern illustrated in FIG. 1a and serving to determine the air tightness of the enclosed space, can be used, simultaneously with the determination of the air tightness of the enclosed space, for determining the internal air volume in the enclosed space. This only requires that during the time period between t1 and t2 in which the oxygen concentration in the enclosed-space air atmosphere is reduced from the first level K1 to the second level K2 for defining a concentration gradient between the space-internal atmosphere and the ambient air atmosphere, the volume flow rate of the inert gas (such as nitrogen) fed into the enclosed space and the oxygen concentration in the inert gas flow is known. This may be accomplished by installing in the inert-gas feed line an appropriate volume flow sensor for measuring the inert-gas volume flow rate at which the inert gas is injected into the enclosed space during the time period between t1 and t2. It would be equally possible, of course, to use an inert-gas source, serving to supply the inert gas for adjusting the concentration gradient between the enclosed-space atmosphere and the ambient air atmosphere, and to control it in a manner whereby it releases the inert gas at a specific preselectable inert-gas volume flow rate.

With regard to the oxygen concentration in the inert gas that is injected in the enclosed-space atmosphere during the time period between t1 and t2, a suitable oxygen or inert-gas sensor may be provided in similar fashion in the inert-gas feed line. Of course, it is also possible to use an inert-gas source which already supplies inert gas containing a known oxygen concentration. In that case a corresponding sensor system for instance in the inert-gas feed line can be dispensed with.

Determining the internal air volume in the enclosed space on the basis of the inert-gas flooding pattern illustrated in FIG. 1a requires the preceding quantification of the proportional oxygen content in the internal atmosphere of the enclosed space. Desirably, that is done at time t1 although, of course, it would be possible to determine the oxygen content in the enclosed-space atmosphere sometime after t1. That later point in time, however, should precede t2, the time at which the oxygen concentration in the space-internal atmosphere (except for a certain control range) is set at the K2 inertization level.

After a known amount of inert gas has been injected into the enclosed-space atmosphere, the proportional oxygen content in the overall space-internal air atmosphere is measured again. Since in this case it is necessary to determine the average oxygen percentage in the space-internal atmosphere, a hardware solution for measuring the oxygen content in the space-internal atmosphere may consist in particular of an aspirating oxygen measuring device that aspirates a representative air sample from the enclosed-space atmosphere and feeds it to an oxygen sensor. Alternatively, it would also be possible to install suitable sensors in different locations within the enclosed space and to then take the average value of the various sensor signals for an optimally accurate mean-value indication of the proportional oxygen content in the enclosed-space atmosphere.

As indicated above, the proportional oxygen content in the space-internal air atmosphere is measured again after the controlled injection of the inert gas into the enclosed space. A good point in time to do that is t2 since t2 is relatively close to t1, i.e. to the time of the first measurement of the oxygen component in the space-internal atmosphere, thus minimizing the effect of the uncontrolled air exchange in the enclosed space on the result of the measurement.

Finally, it is possible to employ for the calculation of the enclosed-space air volume a suitable control system which also controls the air-tightness measurement of the enclosed space and especially that air tightness measurement after taking into account the detected concentration change rate, now including in the equation the proportional oxygen content in the enclosed-space atmosphere determined at time t1, the proportional oxygen content in the enclosed-space atmosphere determined at time t2, as well as the amount of inert gas or oxygen injected in the enclosed-space atmosphere during the time period between t1 and t2.

It follows that, based on the inert-gas flooding pattern exemplarily illustrated in FIG. 1, both the air tightness and the internal air volume of the enclosed space can be measured. In particular, both procedures can take place simultaneously. Since an inert-gas flooding pattern in an enclosed space can be used in the implementation of the method described, it is possible in an inertization process in which the oxygen concentration in an enclosed space being protected is lowered relative to the oxygen concentration in the ambient air to a reduced inertization level, to generate the necessary inert-gas flooding pattern in the enclosed-space atmosphere.

However, it will be self-evident that this invention is not limited to the inert-gas or oxygen concentration in the enclosed-space atmosphere. Instead, this method can be used with any (gaseous) component in the enclosed-space air atmosphere.

Figure 1B:
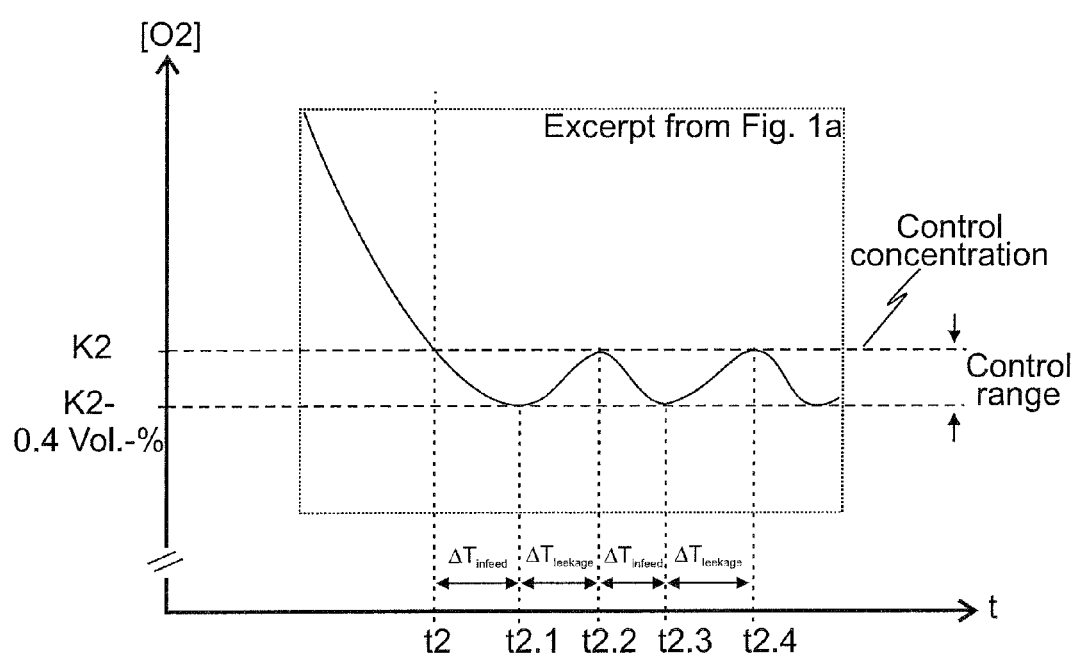

FIG. 1b is an enlarged schematic representation of the window outlined in FIG. 1a by a dotted line. In particular, it shows the time segment of the flooding pattern of FIG. 1a in which, at time t2, the oxygen concentration in the enclosed space reaches the K2 concentration value. As shown, once the K2 concentration value is reached, a control region with oxygen at 0.4% by volume will keep the oxygen content in the enclosed space below the K2 concentration level. This is preferably accomplished in that the oxygen content in the enclosed-space air atmosphere is measured continuously or at regular intervals and the inert gas level is replenished as needed and in controlled fashion. Specifically, provisions are made whereby, upon reaching the K2 concentration level, additional inert gas is injected to further diminish the oxygen content to the lower limit of the control range (K2—oxygen at 0.4% by volume).

As shown in FIG. 1b, the flooding curve reaches the lower limit of the control range at time t2.1. From that point on, for the duration of the time period $\Delta T_{leakage}$, the inert-gas feed to the enclosed space it halted, inhibiting any controlled air exchange for that period. During the time period $\Delta T_{leakage}$ the oxygen content in the enclosed-space atmosphere will rise continuously due to leaks in the space enclosure until finally, at time t2.2, it reaches the upper limit of the control range. In the form of implementation shown in FIG. 1b, the upper limit of the control range is identical to the K2 concentration level; it would nevertheless be equally possible to set the upper limit of the control range at a point below or above K2.

At time t2.2, inert gas is again fed into the enclosed space, long enough for the oxygen concentration in the enclosed-space atmosphere to return to the lower limit of the control range at time t2.3.

Since in the flooding pattern segment per FIG. 1b, during the time period $\Delta T_{infeed}$ between times t2 and t2.1 (or t2.2 and t2.3), a concentration gradient has been set between the enclosed-space air atmosphere and the ambient air atmosphere, while during the time period $\Delta T_{leakage}$ between times t2.1 and t2.2 (or t2.3 and t2.4, etc.) a concentration change rate can be determined, the method according to the invention also lends itself to the measurement of the air tightness of the enclosed space, provided a particular inertization level has been set in the enclosed space and is maintained there by means of a certain control range. Specifically, as the only prerequisite, the time period $\Delta T_{leakage}$ during which the inert-gas feed into the enclosed space is stopped must be measured and the magnitude of the control range must be known. In the form of implementation shown in FIG. 1b, that magnitude of the control range is 0.4% oxygen by volume which is a preferred value for holding the oxygen concentration at a particular inertization level in inert-gas fire extinguishing systems. However, the invention is not limited to that value.

As a particularly preferred procedure during the time in which a specific control range holds the oxygen concentration in the space-internal atmosphere at an inertization level, for instance during the time period between times t2 and t3 (see FIG. 1a), multiple air-tightness measurements of the enclosed space are performed, from which a mean value can be derived and ultimately the value of the air tightness of the enclosed space can be determined with highest possible accuracy.

Figure 2:
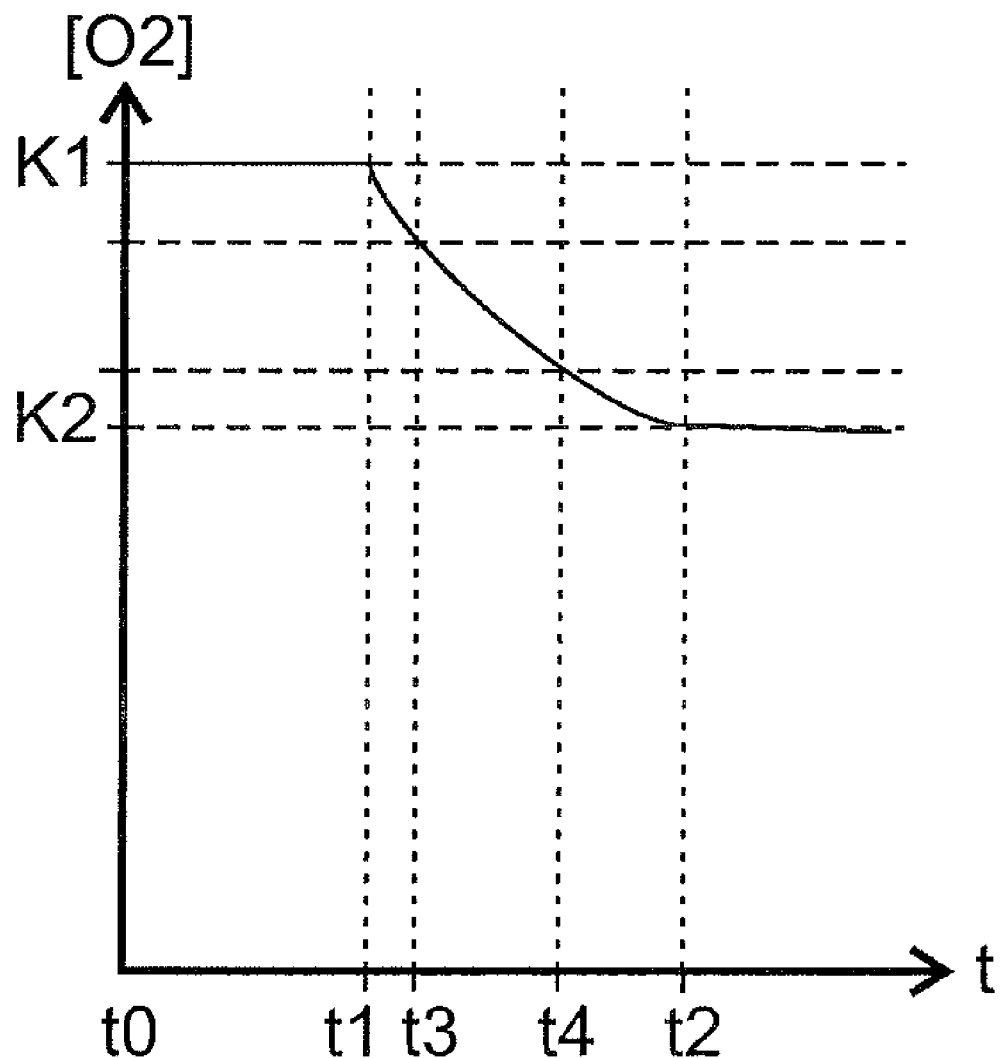
FIG. 2 illustrates an inert-gas flooding pattern in an enclosed space, employing a second preferred form of implementation of the method according to the invention.

FIG. 2 shows an inert-gas flooding curve in an enclosed space, employing a second preferred form of implementation of the method according to the invention for determining the air tightness of the room. Analogous to the form of implementation illustrated in FIG. 1, the oxygen concentration in the space-internal air atmosphere during the time period between t0 and t1 is set at a first concentration value K1. At time t2, inert gas is injected into the enclosed space to lower the oxygen concentration until it reaches the concentration value K2 at time t2.

In contrast to the first form of implementation of the method according to the invention, described with reference to FIG. 1, the second form of implementation per FIG. 2 provides for the air tightness of the enclosed space to be measured during the time period between t1 and t2, i.e. in a time period during which the injection of inert gas causes a controlled air exchange to take place. In this case, the air exchange rate of the controlled air exchange must first be known. In other words, the inert-gas volume flow rate of the inert gas being fed into the enclosed space must be known. As indicated in connection with the determination of the enclosed-space air volume, this may be accomplished for instance by means of a suitable volume flow sensor installed in the inert-gas feed system.

In applying the process described in connection with the flooding curve shown in FIG. 2, the oxygen concentration in the space-internal air atmosphere is determined at times t3 and t4 positioned in the time window between t1 and t2. However, since a concentration change rate that is determined on the basis of these measured values alone reflects both the controlled air exchange rate produced by the injection of the inert gas and the uncontrolled air exchange rate caused by leaks in the building or room enclosure, the proportional quantity of the controlled air exchange must be known in order to be able to determine the concentration change rate attributable to the uncontrolled air exchange. But as explained above, the inert-gas volume flow rate to the enclosed space is a known factor, allowing in simple fashion the determination of the concentration change rate caused by the uncontrolled air exchange and thus of the air-tightness value of the enclosed space, taking into account that concentration exchange rate.

The invention claimed is:

1. Method for determining the air tightness of enclosed spaces, including the following procedural steps:
   a) adjusting a concentration gradient between the internal air atmosphere in an enclosed space and the atmosphere of the air surrounding the enclosed space, such that a concentration of oxygen in the internal air atmosphere in the enclosed space is at a value that differs from the concentration of oxygen in the atmosphere of the air surrounding the enclosed space;
   b) determining a concentration change rate by measuring in the internal air atmosphere in the enclosed space the time-related change of the concentration of oxygen; and
   c) calculating an air-tightness value of the enclosed space, taking into account the previously determined concentration change rate,
   whereby in procedural step a) the concentration gradient between the internal air atmosphere in the enclosed space and the atmosphere of the air surrounding the enclosed space is adjusted in that the oxygen content in the enclosed space is reduced by injecting an oxygen-displacing gas, and
   whereby in procedural step b) the concentration change rate is determined by measuring a time period during which the oxygen content in the internal air atmosphere in the enclosed space changes from a first preselectable value to a second preselectable value.

2. Method as in claim 1, whereby in procedural step b) the concentration change rate is determined by measuring a time period ($\Delta T_{leakage}$) during which, due to leaks in the room enclosure, the oxygen content in the internal air atmosphere in the enclosed space increases continuously from the first preselectable value to the second preselectable value.

3. Method as in claim 1, whereby in procedural step d) a relative air-tightness value is calculated by comparing the concentration change rate with predefined set point values, with the result of that comparison providing information on the time-related increase and decrease of the air tightness of the enclosed space.

4. Method as in claim 3, additionally including under procedural step c) the following procedural step:

setting and maintaining the oxygen content in the internal air atmosphere of the enclosed space, with a preselectable control range, at a control concentration below the operating concentration in the enclosed space, by injecting from an inert-gas source an oxygen-displacing gas into the enclosed space, whereby the control concentration and the operating concentration, including a fail-safe margin, are reduced to a point far enough below the configurational concentration specified for the enclosed space that the ascending slope of the oxygen content upon failure of the inert-gas source will not reach a concentration threshold value, to be established for the enclosed space, until a specific predefined point in time, while the dimensioning of the fail-safe margin takes into account the air-tightness value established for the enclosed space.

5. Method as in claim 4, additionally including the following under procedural step c):
   further monitoring the internal air atmosphere of the enclosed space for a fire-indicating characteristic by means of a sensor serving to detect such a fire-indicating characteristic,
   whereby, upon the detection of a developing or existing fire, the oxygen content in the enclosed space is rapidly reduced to the control concentration if that oxygen content was previously at a higher level.

6. Method as in claim 5, in which the magnitude of the control range is set at an oxygen content of approximately 0.4% by volume and at a level below the control concentration.

7. Method as in claim 6, additionally including the procedural step of calculating the quantity of a fire-extinguishing agent for maintaining the control concentration in the enclosed space, taking into account the previously determined air tightness of the enclosed space.

8. Method as in claim 4, in which the magnitude of the control range is set at an oxygen content of approximately 0.4% by volume and at a level below the control concentration.

9. Method as in claim 4, additionally including the procedural step of calculating the quantity of a fire-extinguishing agent for maintaining the control concentration in the enclosed space, taking into account the previously determined air tightness of the enclosed space.

10. Method as in claim 9, additionally including the procedural step of regulating the inert-gas source as a function of the currently calculated quantity of the fire-extinguishing agent.

11. Method as in claim 1, whereby, in procedural step a), the concentration gradient between the internal air atmosphere in the enclosed space and the atmosphere of the air surrounding the enclosed space is adjusted by the controlled injection of the oxygen-displacing gas into the internal air atmosphere of the enclosed space, wherein the volume flow rate of the oxygen-displacing gas injected into the internal air atmosphere of the enclosed space is known and the oxygen concentration in the oxygen-displacing gas injected into the internal air atmosphere of the enclosed space is of a known value and whereby, in procedural step b), the concentration change rate during the injection of the oxygen-displacing gas into the internal air atmosphere of the enclosed space is determined, and whereby in procedural step c) the air-tightness value of the enclosed space is calculated by taking into account the concentration change rate, the oxygen concentration in the oxygen-displacing gas and the volume flow rate of the oxygen-displacing gas.

12. Method as in claim 1, additionally designed to determine the internal air volume in the enclosed space, for which purpose the method includes the following procedural steps:
- d) determination of the proportional volume of oxygen in the internal air atmosphere of the enclosed space;
- e) controlled injection of oxygen-displacing gas into the internal air atmosphere of the enclosed space, with the oxygen concentration in the oxygen-displacing gas differing from the oxygen concentration in the ambient air atmosphere of the enclosed space and with the volume flow rate of the oxygen-displacing gas injected into the internal air atmosphere of the enclosed space and the oxygen concentration in the oxygen-displacing gas injected into the internal air atmosphere of the enclosed space being known parameters;
- f) renewed determination of the proportional volume of oxygen in the internal air atmosphere of the enclosed space; and
- g) calculation of the space-internal air volume, taking into account the proportional components in the space-internal air atmosphere as determined in procedural steps d) and f), the volume flow rate of the oxygen-displacing gas injected in procedural step e) into the internal air atmosphere of the enclosed space, as well as the oxygen concentration in the oxygen-displacing gas injected into the internal air atmosphere of the enclosed space.

13. Method as in claim 12, in which the procedural steps e) and a) are performed concurrently.

14. Method as in claim 12, whereby in procedural step c) an absolute air-tightness value is computed by calculating from the concentration change rate and the internal air volume of the enclosed space a volume-flow-related leakage rate and converting the latter into an absolute air-tightness value.

15. Method as in claim 14, in which the procedural steps e) and a) are performed concurrently.

* * * * *